(12) United States Patent
Karmazin

(10) Patent No.: US 6,445,699 B1
(45) Date of Patent: Sep. 3, 2002

(54) APPARATUS FOR PROCESSING AND GENERATING DATA USING A DIGITAL SIGNAL PROCESSOR

(75) Inventor: Pavel Karmazin, Gauting (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/382,529

(22) Filed: Aug. 25, 1999

Related U.S. Application Data

(63) Continuation of application No. PCT/DE98/00467, filed on Feb. 17, 1998.

(51) Int. Cl.[7] .......................... H04L 12/50; H04Q 11/00
(52) U.S. Cl. ...................................................... 370/359
(58) Field of Search ............................. 710/52, 53, 71; 370/359, 366, 412, 413, 419, 474, 354, 435, 351, 357

(56) References Cited

U.S. PATENT DOCUMENTS

| | | | | |
|---|---|---|---|---|
| 4,991,169 A | * | 2/1991 | Davis et al. | 370/463 |
| 5,280,532 A | * | 1/1994 | Shenoi et al. | 370/474 |
| 5,349,579 A | * | 9/1994 | Madonna et al. | 370/259 |
| 5,600,646 A | * | 2/1997 | Polomski | 370/263 |
| 5,650,861 A | * | 7/1997 | Nakajima et al. | 358/433 |
| 5,671,445 A | * | 9/1997 | Gluyas et al. | 710/53 |
| 5,825,408 A | * | 10/1998 | Yuyama et al. | 348/14 |
| 5,938,748 A | * | 8/1999 | Lynch et al. | 710/53 |

FOREIGN PATENT DOCUMENTS

| | | |
|---|---|---|
| DE | 4414554 A1 | 11/1995 |
| EP | 0585480 A1 | 3/1994 |
| EP | 0691796 A2 | 1/1996 |

OTHER PUBLICATIONS

Published International Application No. 97/35251 (Asghar et al.), dated Sep. 25, 1997.
Japanese Patent Abstract No. 06326870 (Sakae), dated Nov. 25, 1994.

* cited by examiner

Primary Examiner—Kwang Bin Yao
Assistant Examiner—Kevin C. Harper
(74) Attorney, Agent, or Firm—Laurence A. Greenberg; Werner H. Stemer; Ralph E. Locher

(57) ABSTRACT

The invention describes a method and apparatus for processing and generating data using a digital signal processor. An interface unit for the signal processor is provided that reads in and preprocesses the data to be processed and/or data required for processing and/or generating data and supplies the data for pickup by the signal processor. Also, data which the signal processor processes or generates and supplies for pickup are postprocessed and output by the interface unit.

11 Claims, 4 Drawing Sheets

APPARATUS FOR PROCESSING AND GENERATING DATA USING A DIGITAL SIGNAL PROCESSOR

CROSS-REFERENCE TO RELATED APPLICATION

This is a continuation of copending International Application PCT/DE98/00467, filed Feb. 17, 1998, which designated the United States.

BACKGROUND OF THE INVENTION

Field of the Invention

The invention lies in the electronics and communications fields. Specifically, the invention relates to an apparatus for processing and generating data using a digital signal processor. The apparatus includes an interface unit allocated to a signal processor. The interface reads in and preprocesses the data to be processed and/or the data required for processing, and/or generates data and for the signal processor to pick up and/or picks up, postprocesses and outputs data which the signal processor processes or generates and supplies for pickup. The interface unit has a preprocessing and postprocessing device provided for pre- and postprocessing the data. A memory device is provided for supplying the data that have been preprocessed and are to be postprocessed for the signal processor or the preprocessing and postprocessing device to pick up. The preprocessing and postprocessing device has an expansion/compression device which can be used to expand the data read in and to compress the data to be output. The memory device is set up such that the preprocessing and postprocessing device and the signal processor can have quasi-simultaneous read and write access.

Such methods and apparatuses are used, by way of example but by no means exclusively, in ISDN private branch exchanges. ISDN private branch exchanges are systems, generally installed on a telecommunication subscriber's premises, which can be used to connect a multiplicity of telecommunications terminals (telephones, fax machines, modems and the like) which are connected to them to one another and/or to one or more subscriber lines (exchange lines) in a telecommunications network.

Patent Abstracts of Japan Vol. 095, No. 002, Mar. 31, 1995 & JP 06 326870 A discloses an apparatus, for example, which has a dual port RAM for processing data interchanged between a modem and a fax more efficiently. With that configuration it is possible for the modem and the fax to write to and read from the dual port RAM at the same time. The modem has a signal processor, which processes the data, and a front-end processor connected upstream of the signal processor for preprocessing the data.

A conventional design of an ISDN private branch exchange is illustrated in FIG. 4. There, the private branch exchange includes one or more transceivers 11a, 11b, . . . 11n, a digital signal processor 12 and a control and switching device 13; the transceivers 11a, 11b, . . . 11n and the digital signal processor 12 are connected to the control and switching device 13 via connection lines 14.

The transceivers 11a, 11b, . . . 11n can have telecommunications terminals and/or one or more exchange lines connected to them. The number of transceivers 11a, 11b, . . . 11n to be provided is geared to the number and types of telecommunications terminals and exchange lines to be connected. In the exemplary embodiment under consideration, the transceiver 11a may be designed for connecting one or more conventional (analog) telecommunications terminals, the transceiver 11b may be designed for connecting one or more (digital) ISDN telecommunications terminals, and the transceiver 11n may be designed for connecting one or more ISDN exchange lines. In this context, the term "designed" is to be understood to mean constructed and configured.

Calls incoming via an exchange line from the telephone company are forwarded via the transceiver 11n to the control and switching device 13 and from there to the telecommunications terminal addressed by the call; outgoing calls from the telecommunications terminals are likewise routed to the control and switching device 13 and from there are connected to the specified location, which can be another of the telecommunications terminals connected to the private branch exchange or can be one of the connected exchange lines.

The control and switching device 13 supplies the signal processor 12 with all the data and information received by the private branch exchange from the telecommunications terminals and telephone company exchange lines. The signal processor 12 processes the received data as necessary to produce modified data, or generates new data and outputs or returns the data to the control and switching device 13. The control and switching device 13 receives the data and outputs them to the addressed telecommunications terminals and exchange lines in place of the data received by the telecommunications terminals and exchange lines.

This means that, to name just a few from an almost arbitrary number of examples, it is possible, among other things, to:

generate specific signal tones (call connected signal, busy signal) and/or specific messages (for example a message indicating that the call will not be connected because a telecommunications terminal with the service indicator "telephone" is calling a telecommunications terminal with the service indicator "fax") and the like;

feed back the subscriber's speech into the telephone muted on the telephone so that it can be overheard by the speaker; and connect more than two subscribers and/or telecommunications terminals to one another (conference call connection).

However, experience shows that the tasks to be dealt with by the signal processor to achieve this take it to its performance limits very quickly. The result of this is that either a number of signal processors have to be used or certain convenience features of the private branch exchange have to be sacrificed. This is obviously a considerable disadvantage.

SUMMARY OF THE INVENTION

It is accordingly an object of the invention to provide an apparatus for processing and generating data with a digital signal processor, which overcomes the above-mentioned disadvantages of the heretofore-known devices and methods of this general type and which enables even work-intensive processing and generation of data using low-power and/or a minimal number of signal processors.

With the foregoing and other objects in view there is provided, in accordance with the invention, an apparatus for processing and generating data, comprising:

a digital signal processor;

an interface unit connected to the signal processor, the interface unit being adapted to read in and preprocess data for the signal processor and to postprocess and output data from the signal processor;

the interface unit including a preprocessing and postprocessing device for preprocessing and postprocessing the data, and a memory device connected to the preprocessing and postprocessing device and to the signal processor;

the memory device being divided into four memory areas including two memory areas reserved for write access by the preprocessing and postprocessing device and for read access by the signal processor, and two memory areas reserved for write access by the signal processor and for read access by the preprocessing and postprocessing device.

The memory, therefore, allowing quasi-simultaneous read and write access by the preprocessing and postprocessing device and by the signal processor In other words, an interface unit is provided which is allocated to the signal processor and reads in and preprocesses the data to be processed and/or data required for processing and/or generating data and supplies it for the signal processor to pick up and/or picks up, postprocesses and outputs data which the signal processor processes or generates and supplies for pickup. To this end, the interface unit has a pre- and postprocessing device provided for pre- and postprocessing the data, and a memory device provided for supplying the data which has been preprocessed and is to be postprocessed for the signal processor or the pre- and postprocessing device to pick up. The pre- and postprocessing device has an expansion/compression device which can be used to expand the data read in and to compress the data to be output. The memory device is designed such that the pre- and postprocessing device and the signal processor can have read and/or write access to it at virtually the same time. According to the invention, the memory device is divided into four memory areas, two of which are reserved for the pre- and postprocessing device to write to and for the signal processor to read from, and the other two are reserved for the signal processor to write to and for the pre- and postprocessing device to read from.

The input and/or output of data and its pre- and/or postprocessing by the interface unit associated with the signal processor relieve the burden on the signal processor quite significantly and thereby make it possible for the signal processor to be essentially able to provide its full performance for the actual data processing and/or data generation.

Hence, an apparatus has been found by means of which even work-intensive processing and generation of data is possible using low-power and/or a minimal number of signal processors.

At the same time, however, the interface unit relieving the burden on the signal processor can be of relatively simple design and relatively simple to operate, because its function can be limited to carrying out simple (yet in the aggregate very time-consuming) pre- and/or postprocessing steps, such as serial/parallel and parallel/serial conversions, table-supported coding or decoding operations, and the like.

In accordance with an added feature of the invention, the two memory areas reserved for write access by the preprocessing and postprocessing device and for read access by the signal processor include a first memory area reserved for write access and a second memory area reserved for read access, and the first and second memory areas are interchanged cyclically during operation.

In accordance with an additional feature of the invention, the two memory areas reserved for write access by the signal processor and for read access by the preprocessing and postprocessing device include a third memory area reserved for write access by the signal processor and a fourth memory area reserved for read access by the preprocessing and postprocessing device, and the third and fourth memory areas are interchanged cyclically during operation.

In accordance with another feature of the invention, the apparatus is an integral part of an ISDN switching system.

In accordance with a further feature of the invention, the memory areas of the memory device are dimensioned to store decompressed data in an IOM-2 frame.

In accordance with again an added feature of the invention, the preprocessing and postprocessing device includes a serial/parallel converter for converting serial input data to parallel data. Preferably, the preprocessing and post-processing device also includes a parallel/serial converter for converting parallel input data to serial data.

In accordance with a concomitant feature of the invention, the preprocessing and postprocessing device includes an expansion/compression device adapted to expand input data and to compress output data. In a preferred variant of the invention, the expansion/compression device expands and compresses data using tables stored in a read-only memory device.

Other features which are considered as characteristic for the invention are set forth in the appended claims.

Although the invention is illustrated and described herein as embodied in an apparatus for processing and generating data using a digital signal processor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

The invention will be described below in detail with reference to an ISDN private branch exchange or—in more general terms—an exchange or subscriber ISDN switching system. Although the invention can be used to very good effect in this area, there is no restriction to the use of the invention in this manner. In principle, the invention can be employed in any desired apparatus for any desired purposes.

Figure 1:
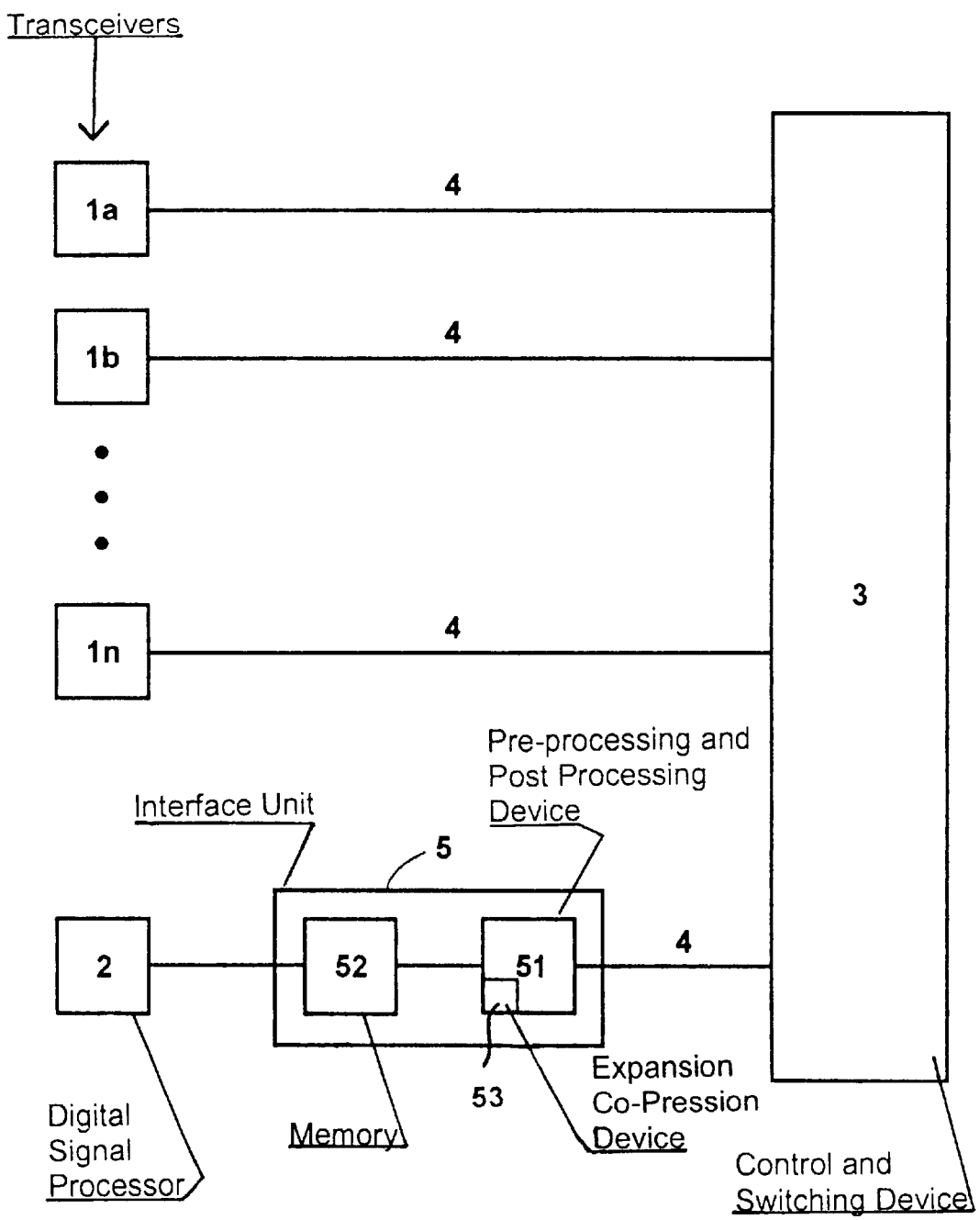
FIG. 1 is a block diagram of an ISDN private branch exchange laid out and operated according to the invention.

Referring now to the figures of the drawing in detail and first, particularly, to FIG. 1 thereof, there is seen an ISDN private branch exchange which comprises one or more transceivers 1a, 1b, . . . 1n, a digital signal processor 2, a control and switching device 3 and an interface unit 5 allocated to the signal processor 2 and connected between the signal processor 2 and the control and switching device 3. The transceivers 1a, 1b, . . . 1n and the interface unit 5 are connected to the control and switching device 3 by means of connection lines 4.

Figure 4:
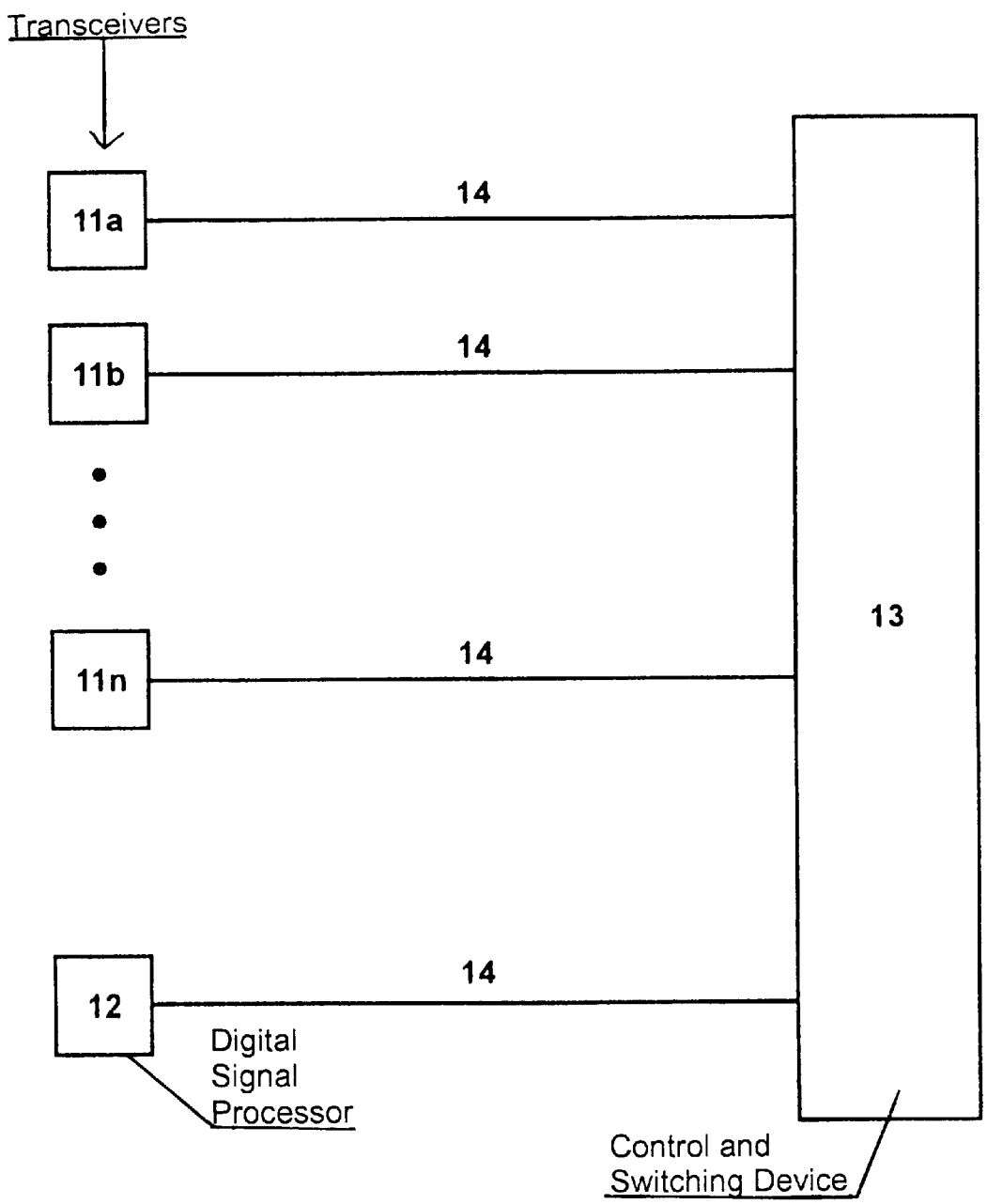
FIG. 4 is a block diagram of a conventional ISDN private branch exchange.

The transceivers 1a, 1b, . . . 1n, the signal processor 2, the control and switching device 3 and the connection lines 4 correspond to the transceivers 11a, 11b, . . . 11n, the signal processor 12, the control and switching device 13 and the connection lines 14, respectively, shown in FIG. 4.

The transceivers 1a, 1b, . . . 1n can have non-illustrated telecommunications terminals and/or one or more exchange lines connected to them. The number of transceivers 1a, 1b, . . . 1n to be provided is geared to the number and types of telecommunications terminals and exchange lines to be connected. In the exemplary embodiment under consideration, the transceiver 1a may be designed for connecting one or more conventional (analog) telecommunications terminals, the transceiver 1b may be designed for connecting one or more (digital) ISDN telecommunications terminals, and the transceiver 1n may be designed for connecting one or more ISDN exchange lines. Again, the term "designed" as used in this context means constructed and configured.

Calls incoming via an exchange line are forwarded via the transceiver 1n to the control and switching device 3 and from there to the telecommunications terminal addressed by the call. Outgoing calls from the telecommunications terminals are likewise routed to the control and switching device 3 and from there are connected to the specified location, which can be another of the telecommunications terminals connected to the private branch exchange or can be one of the connected exchange lines.

The control and switching device 3 supplies the signal processor 2 with selected data and information received by the private branch exchange from the telecommunications terminals and exchange lines. The signal processor 2 processes the received data as necessary to produce modified data, or generates new data and outputs or returns them to the control and switching device 3. The control and switching device 3 receives the data and outputs them to the addressed telecommunications terminals and exchange lines in place of the data received by the telecommunications terminals and exchange lines.

Unlike in conventional private branch exchanges, the signal processor 2 and the control and switching device 3 do not communicate with one another directly but via the interface unit 5. The signal processor 2 and the interface unit 5 operate together, as described in greater detail below, and complement one another in terms of their function and operation. This relieves the burden on the signal processor 2, in particular.

As in conventional ISDN private branch exchanges, this means that signal tones and/or voice signals can be generated and/or combined.

The connection lines 4, by means of which the transceivers 1a, 1b, . . . 1n and the interface unit 5 are connected to the control and switching device 3 as shown in FIG. 1, are 4-wire lines representing so-called IOM interfaces.

The IOM interface, to be more precise the IOM-2 interface used in the present case, is a standardized interface for communication between chips (interchip communication) in ISDN systems.

Of the four individual lines each forming a connection line 4, two lines are provided for clock signal transmission and two lines are provided for data transmission.

The clock signals transmitted are a so-called frame-synchronization clock (8 kHz) and a data clock (2.048 or 4.096 or 8.192 MHz), the frame-synchronization clock being transmitted via an FSC line and the data clock being transmitted via a DCL line.

Of the two lines for data transmission, a so-called DD (data downstream) line is used for transmitting data from the control and switching device 3 to the transceivers 1a, 1b, . . . 1n and the interface unit 5, and a so-called DU (data upstream) line is used for transmitting data in the opposite direction, i.e. from the transceivers 1a, 1b, . . . 1n and the interface unit 5 to the control and switching device 3.

As already indicated in the above explanation, the data transmitted via the data lines DD and DU are transmitted serially bit by bit in units. The units are so-called frames, wherein one data frame comprises 256 or 512 bits, depending on the data clock used.

Each data frame is in turn composed of blocks (channels) comprising 32 bits, of which 2 times 8 bits are intended for the useful data (voice signals, fax signals etc.) and two times 8 bits are intended for control signals and status information.

Figure 2:
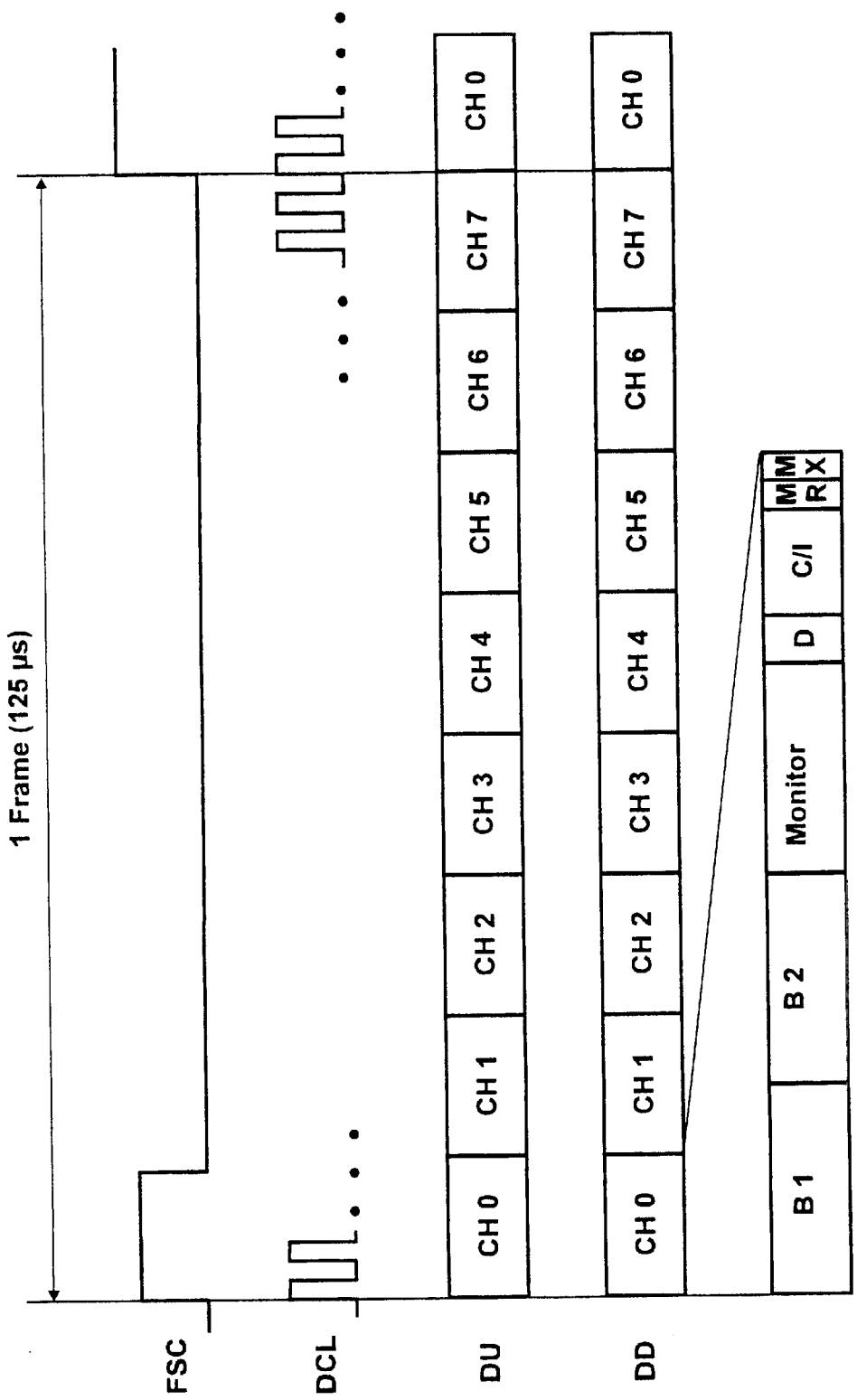
FIG. 2 is a schematic block illustration explaining the IOM-2 standard.

The above comments on the IOM-2 interface and further details are illustrated in FIG. 2 for a data rate of 2.048 Mbit/s. The abbreviations used there have the following meanings:

| | |
|---|---|
| FSC | Frame-synchronization clock (8 kHz) |
| DCL | Data clock (2.048 or 4.096 MHz) |
| DD | Downstream data (2.048 Mbit/s) |
| DU | Upstream data (2.048 Mbit/s) |
| B1, B2 | B channels (useful data) |
| Monitor | Monitor channel |
| D | Signaling channel |
| CI | Command/Indication channel |
| MR | Monitor Receive handshake signal |
| MX | Monitor Transmit handshake signal |

For further details about the IOM-2 interface, reference is had to the appropriate ETSI and ANSI standards.

The data received by the interface unit 5 from the control and switching device 3 via the connection line 4, to be more precise via the DD line thereof, comprises data received by the control and switching device 3 from the connected telecommunications terminals and exchange lines. This enables the interface unit 5 and/or the signal processor 2 to react immediately and comprehensively to any kind of event. In this case, data received via the DD line are modified as necessary and/or new data are generated (at least partly depending on the control data and status information likewise received via the DD line). The data modified by the interface unit 5 and/or the control and switching device 3 or left unchanged are eventually output (returned) via the connection line 4, to be more precise via the DU line thereof, to the control and switching device 3. From there, the data are then forwarded (via the respectively appropriate DD lines of the connection lines 4) to the telecommunications terminals or to the exchange line(s) for which the data are intended.

As illustrated in FIG. 1, the interface unit 5 in the example comprises a preprocessing and postprocessing device 51 and a memory device 52.

The preprocessing and postprocessing device 51 reads in the data transmitted from the control and switching device 3 via the connection line 4, subjects them to a preprocessing operation and writes them to the memory device 52. There, the data are then available for the signal processor 2 to pick up and process further. The signal processor 2 reads out the data supplied in the memory device 52 from the memory device, processes them further and writes them to the memory device 52. There, the data are then available for the preprocessing and postprocessing device 51 to pick up and postprocess. The preprocessing and postprocessing device 51 reads out the data supplied in the memory device 52 from the memory device, carries out subsequent postprocessing and finally outputs the data to the control and switching device 3 via the DU line of the connection line 4.

The above-mentioned preprocessing operation, carried out by the preprocessing and postprocessing device 51, comprises, in the example under consideration, serial/parallel conversion of the data read in serially bit by bit and conversion, to be more precise $\mu$-law conversion or a-law conversion, of selected data. The $\mu$-law conversion or a-law conversion is used to expand the useful data compressed for transmission depending on level; a-law and $\mu$-law are different standards, whereby the $\mu$-law standard is used in the United States, Canada, Japan and the Philippines, and the a-law standard is used in other countries.

A expansion/compression device is diagrammatically indicated at 53 in FIG. 1.

In addition to the preprocessing steps, the preprocessing and postprocessing device 51 can also carry out other or further processing steps as an alternative or in addition. Which and how many processing steps are carried out in the preprocessing and postprocessing device 51 depends on each individual case. Generally speaking, the aim is for the received data to be prepared by whatever kind of preprocessing such that it can subsequently be processed further by the signal processor 2 as efficiently as possible. The intended result is that the signal processor 2 is thereby relieved of complex activities which can be performed (more) efficiently elsewhere.

Conversely, when data generated and/or processed by the signal processor 2 are being postprocessed, reconversion and parallel/serial conversion of the data are carried out. In addition, the data can also (for example via a so-called tristate control line) be marked as invalid (for example by time slot).

In addition to the postprocessing steps, the preprocessing and postprocessing device 51 can also carry out other or further processing steps as an alternative or in addition. Which and how many processing steps are carried out in the preprocessing and postprocessing device 51 depends on each individual case. Generally speaking, the aim is for postprocessing of the received data to start where processing of the data by the signal processor 2 would begin to become inefficient. The intended result is that the signal processor 2 is thereby relieved of complex activities which can be performed (more) efficiently elsewhere.

The data eventually output via the DU line of the connection line 4 to the control and switching device 3 are again in the IOM format, to be more precise the IOM-2 format.

When the data are preprocessed and postprocessed by the preprocessing and postprocessing device 51, it is found to be advantageous if the processing steps to be carried out for this by the preprocessing and postprocessing device 51 enable the preprocessing and postprocessing device 51 to be of simple design and simple to operate. This is the case in the example presently under consideration, because serial/parallel conversion, parallel/serial conversion and data conversion, which is in this case carried out in table-oriented fashion using a ROM, do not require especially great complexity for the design and operation of the preprocessing and post-processing device 51.

The memory device 52, to which and from which, respectively, the data preprocessed by the preprocessing and postprocessing device 51 and the data processed further by the signal processor 2 are written or read, is or behaves like a so-called dual port RAM (DPRAM). DPRAMs are distinguished by the fact that a plurality of write and/or read access operations can take place at the same time. In the exemplary embodiment under consideration, the DPRAM can be written to and read from both by the preprocessing and postprocessing device 51 and by the signal processor 2. Data written to the memory device 52 by the preprocessing and postprocessing device 51 can thus be read from the memory device by the signal processor 2 unprompted, and, conversely, data written to the memory device 52 by the signal processor 2 can be read from the memory device by the preprocessing and postprocessing device 51 unprompted.

In the exemplary embodiment, the data are processed and temporarily stored in the memory device 52 in units of frames, which, as mentioned above, comprise 256 bits (slow IOM interface) or 512 bits (fast IOM interface).

The memory device 52 can store the data from four frames; for this purpose, the memory device 52 is divided into four areas, each area being able to store the data from one frame. Of the four memory areas, two memory areas are reserved for the preprocessing and postprocessing device 51 to write data and for the signal processor 2 to read the data, and two memory areas are reserved for the signal processor 2 to write data and for the preprocessing and postprocessing device 51 to read data.

Of the two memory areas reserved for the preprocessing and postprocessing device 51 to write data and for the signal processor 2 to read the data, new data are written to one (by the preprocessing and postprocessing device 51) and previously written data are read from the other (by the signal processor 2). The memory area to which the preprocessing and postprocessing device 51 writes new data and the memory area from which the signal processor 2 reads data are interchanged after each frame. This makes it possible to ensure that the signal processor 2 reads only frames which have already been written to the memory device completely, and that the frame which has just been read is not overwritten as early as during reading.

A similar case applies for data being written to the memory device 52 by the signal processor 2 and for these data being read by the preprocessing and postprocessing device 51. Of the two memory areas reserved for the signal processor 2 to write data and for the preprocessing and postprocessing device 51 to read the data, new data are written to one (by the signal processor 2) and previously written data are read from the other (by the preprocessing and postprocessing device 51). The memory area to which the signal processor 2 writes new data and the memory area from which the preprocessing and postprocessing device 51 reads data are interchanged after each frame. This makes it possible to ensure that the preprocessing and postprocessing device 51 reads only frames which have already been written to the memory device completely, and that the frame which has just been read is not overwritten as early as during the read operation.

Figure 3A:
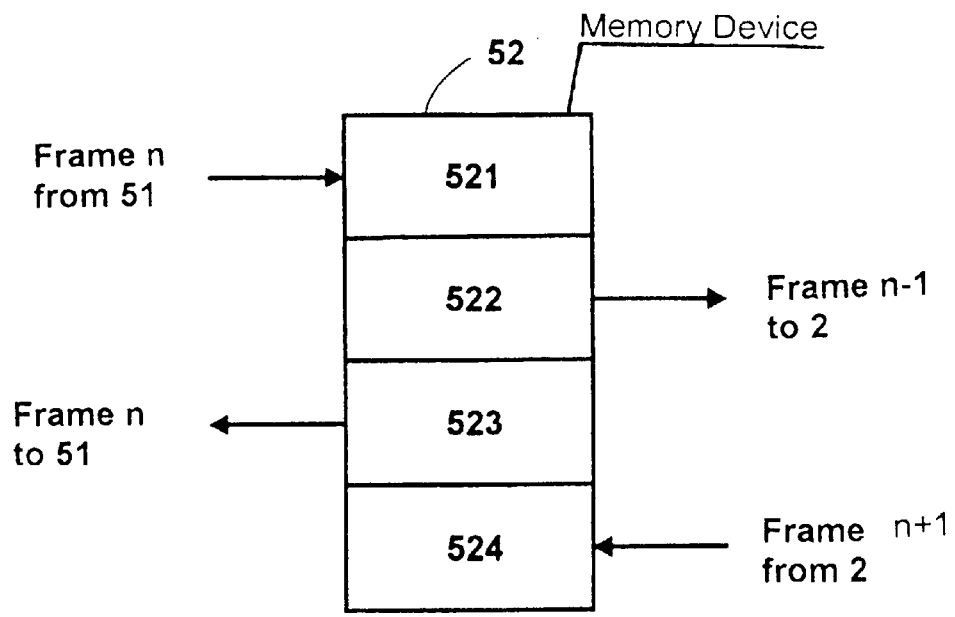
FIGS. 3A and 3B are diagrammatic views illustrating the layout and use of a memory device in which data preprocessed by an interface unit are supplied for the signal processor to pick up and process further and data processed or generated by the signal processor are supplied for the interface unit to pick up and process further.
Figure 3B:
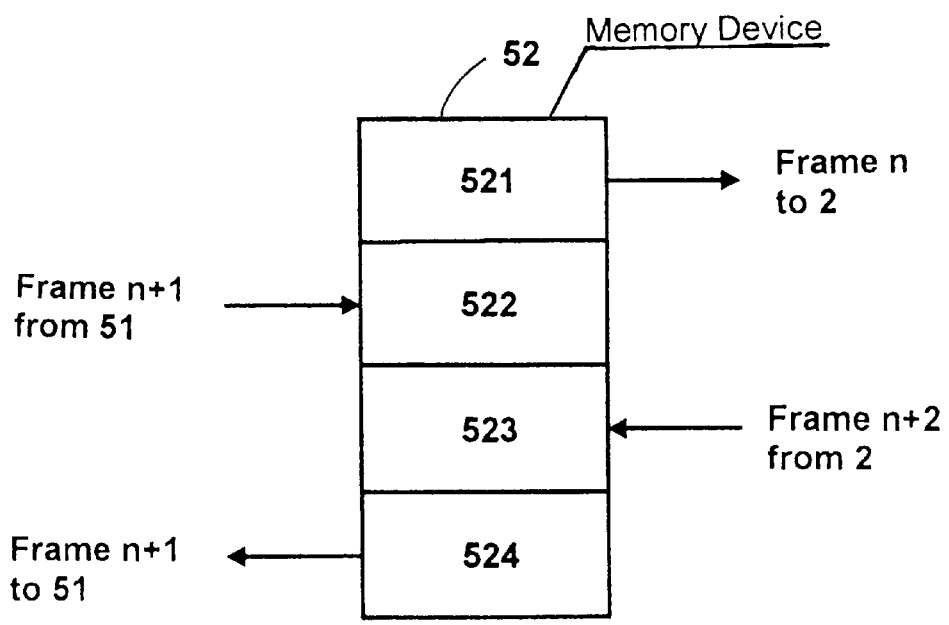

This procedure is explained below with reference to FIGS. 3A and 3B. FIGS. 3A and 3B are schematic illustrations of the memory device 52 and of data being written to and read from it.

The four memory areas of the memory device 52 are denoted in the figures by the reference numerals 521 to 524.

With reference to FIG. 3A, at a given instant:

the preprocessing and postprocessing device 51 is writing an (input) frame n to the memory area 521; and the signal processor 2 is reading from the memory area 522 an (input) frame n−1 written there beforehand.

Similarly, the signal processor 2 is writing an (output) frame n+1 to the memory area 524; and the preprocessing and postprocessing device 51 is reading from the memory area 523 an (output) frame n written there beforehand.

With reference to FIG. 3B, at a later instant, i.e., at an instant one frame (125 ms) later:

the preprocessing and postprocessing device 51 is writing an (input) frame n+1 to the memory area 522; and the signal processor 2 is reading from the memory area 521 the (input) frame n written there immediately beforehand.

Similarly:

the signal processor 2 is writing an (output) frame n+2 to the memory area 523; and the preprocessing and postprocessing device 51 is reading from the memory area 524 the (output) frame n+1 written there immediately beforehand.

Another frame clock pulse later, the memory device 52 is accessed as shown in FIG. 3A.

Although not described in detail, the individual memory areas 521 to 524 can be divided as necessary into any desired number of blocks which can be accessed in any desired sequence.

The memory device 52 can be accessed by the preprocessing and postprocessing device 51 and the signal processor 2 directly or "only" indirectly via a DMA unit. The latter case, i.e. access to the memory device 52 via a DMA unit, is found to be advantageous particularly in the case of the preprocessing and postprocessing device 51.

The above explanations make it clear that the signal processor 2 is significantly relieved, in terms of workload, as compared with the case where it is connected, as beforehand, to the control and switching device 3 directly, i.e. without the interface unit 5 (whose surface area can be made very small in comparison with the signal processor 2) being connected in between. This means that the signal processor 2 can now undertake tasks which it was previously unable to undertake for lack of power reserves.

Data in any desired format and having any desired content can be interchanged between the interface unit 5 and the control and switching device 3 and/or the signal processor 2. Consequently, there is also no restriction on the use of the IOM or IOM-2 format. Instead, any other desired (standardized or non-standardized) data formats, possibly even alternately different data formats, can be used.

A method and apparatus have therefore been found which make even work-intensive processing and generation of data possible using low-power and/or a minimal number of signal processors.

I claim:

1. An apparatus for processing and generating data, comprising:

a digital signal processor; and an interface unit connected to said digital signal processor, said interface unit being adapted to read in and preprocess data for said signal processor and to postprocess and output data from said digital signal processor;

said interface unit including a preprocessing and postprocessing device for preprocessing and postprocessing the data, and a memory device connected to said preprocessing and postprocessing device and to said digital signal processor;

said preprocessing and postprocessing device including an expansion/compression device adapted to expand input data and to compress output data;

said memory device being divided into four memory areas including two memory areas reserved for write access by said preprocessing and postprocessing device and for read access by said digital signal processor, and two memory areas reserved for write access by said digital signal processor and for read access by said preprocessing and postprocessing device; and wherein said digital signal processor is an ISDN processor and the apparatus is an integral part of an ISDN switching system.

2. The apparatus according to claim 1, wherein said two memory areas reserved for write access by said preprocessing and postprocessing device and for read access by said digital signal processor include a first memory area reserved for write access and a second memory area reserved for read access, and said first and second memory areas are interchanged cyclically during operation.

3. The apparatus according to claim 2, wherein said two memory areas reserved for write access by said digital signal processor and for read access by said preprocessing and postprocessing device include a third memory area reserved for write access by said signal digital processor and a fourth memory area reserved for read access by said preprocessing and postprocessing device, and said third and fourth memory areas are interchanged cyclically during operation.

4. The apparatus according to claim 1, wherein said two memory areas reserved for write access by said digital signal processor and for read access by said preprocessing and postprocessing device include a third memory area reserved for write access by said digital signal processor and a fourth memory area reserved for read access by said preprocessing and postprocessing device, and said third and fourth memory areas are interchanged cyclically during operation.

5. The apparatus according to claim 1, wherein said memory areas of said memory device are dimensioned to store therein decompressed data in an IOM-2 frame.

6. An apparatus for processing and generating data, comprising:

only a single digital signal processor;

an interface unit connected to said digital signal processor, said interface unit being adapted to read in and preprocess data for said signal processor and to postprocess and output data from said digital signal processor;

said interface unit including a preprocessing and postprocessing device for preprocessing and postprocessing the data, and a memory device connected to said preprocessing and postprocessing device and to said digital signal processor;

said preprocessing and postprocessing device including an expansion/compression device adapted to expand input data and to compress output data;

said memory device being divided into four memory areas including two memory areas reserved for write access by said preprocessing and postprocessing device and for read access by said digital signal processor, and two memory areas reserved for write access by said digital signal processor and for read access by said preprocessing and postprocessing device.

7. The apparatus according to claim 6, wherein said two memory areas reserved for write access by said preprocessing and postprocessing device and for read access by said digital signal processor include a first memory area reserved for write access and a second memory area reserved for read access, and said first and second memory areas are interchanged cyclically during operation.

8. The apparatus according to claim 6, wherein said two memory areas reserved for write access by said digital signal processor and for read access by said preprocessing and postprocessing device include a third memory area reserved for write access by said digital signal processor and a fourth memory area reserved for read access by said preprocessing and postprocessing device, and said third and fourth memory areas are interchanged cyclically during operation.

9. An apparatus for processing and generating data, comprising:

a digital signal processor;

an interface unit connected to said digital signal processor, said interface unit being adapted to read in and preprocess data for said signal processor and to postprocess and output data from said digital signal processor;

said interface unit including a preprocessing and postprocessing device for preprocessing and postprocessing the data, and a memory device connected to said preprocessing and postprocessing device and to said digital signal processor;

said preprocessing and postprocessing device including an expansion/compression device adapted to expand input data and to compress output data;

said preprocessing and postprocessing device including a serial/parallel converter for converting serial input data to parallel data;

said memory device being divided into four memory areas including two memory areas reserved for write access by said preprocessing and postprocessing device and for read access by said digital signal processor, and two memory areas reserved for write access by said digital signal processor and for read access by said preprocessing and postprocessing device.

10. An apparatus for processing and generating data, comprising:

a digital signal processor;

an interface unit connected to said digital signal processor, said interface unit being adapted to read in and preprocess data for said signal processor and to postprocess and output data from said digital signal processor;

said interface unit including a preprocessing and postprocessing device for preprocessing and postprocessing the data, and a memory device connected to said preprocessing and postprocessing device and to said digital signal processor;

said preprocessing and postprocessing device including an expansion/compression device adapted to expand input data and to compress output data;

said preprocessing and postprocessing device including a parallel/serial converter for converting parallel input data to serial data;

said memory device being divided into four memory areas including two memory areas reserved for write access by said preprocessing and postprocessing device and for read access by said digital signal processor, and two memory areas reserved for write access by said digital signal processor and for read access by said preprocessing and postprocessing device.

11. The apparatus according to claim 1, wherein said expansion/compression device expands and compresses data using tables stored in a read-only memory device.

* * * * *

UNITED STATES PATENT AND TRADEMARK OFFICE
CERTIFICATE OF CORRECTION

PATENT NO. : 6,445,699 B1
DATED : September 3, 2002
INVENTOR(S) : Pavel Karmazin It is certified that error appears in the above-identified patent and that said Letters Patent is hereby corrected as shown below:

<u>Title page,</u>
Item [30], insert:

-- [30]        Foreign Application Priority Data

Feb. 25, 1997   (DE) ……………………....197 07 489.8 --

Signed and Sealed this

Seventh Day of January, 2003

JAMES E. ROGAN
*Director of the United States Patent and Trademark Office*

UNITED STATES PATENT AND TRADEMARK OFFICE
CERTIFICATE OF CORRECTION

PATENT NO.   : 6,445,699 B1
DATED        : September 3, 2002
INVENTOR(S)  : Pavel Karmazin It is certified that error appears in the above-identified patent and that said Letters Patent is hereby corrected as shown below:

This certificate supersedes Certificate of Correction issued January 7, 2003, the number was erroneously mentioned and should be vacated since Certificate of Correction should not have been granted.

Signed and Sealed this

Fourteenth Day of September, 2004

JON W. DUDAS
*Director of the United States Patent and Trademark Office*